Figure 1:
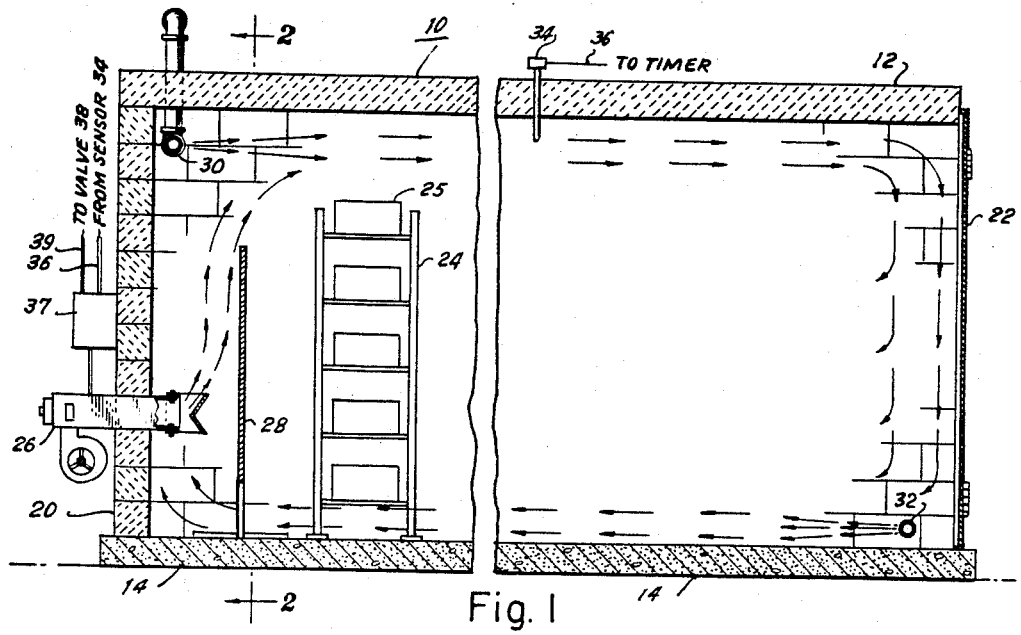

March 1, 1966

J. W. TARLTON ETAL 3,238,279

METHOD FOR CURING CONCRETE PRODUCTS

Filed July 27, 1962

INVENTORS
Terrell Johnson
John W. Tarlton

BY

ATTORNEY

United States Patent Office 3,238,279
Patented Mar. 1, 1966

3,238,279
METHOD FOR CURING CONCRETE PRODUCTS
John W. Tarlton, 8400 Omaha Drive, Fort Worth 8, Tex., and Terrell Johnson, 8626 Vinewood Drive, Dallas, Tex.
Filed July 27, 1962, Ser. No. 212,918
13 Claims. (Cl. 264—82)

The present invention relates to the curing of concrete products and more particularly to a method for curing concrete products using a combination of steam and carbon dioxide at ambient pressures.

The problem of curing concrete products is one that has existed for many years. Thus, in the absence of special curing facilities, it will normally require from 24 hours to a week of curing under standard atmospheric conditions for concrete or cementitious products to reach what is commonly referred to as the stable jell state in which hydration of the cement is completed. Thereafter, a minimum of 30 to 60 days of air curing is required before the product is sufficiently cured that it can be utilized as a structural material.

Many different methods and apparatus for lessening the time required to cure concrete products have been proposed during the past century. One of the earliest methods utilized to increase the curing rate of concrete products was to cure the products in a steam ambient. Although the use of steam decreased the curing cycle considerably, it is effective only to the extent that it greatly increased the speed at which hydration of the cement occurs. Thus, the maximum benefits from the steam cure are achieved after only a relatively few hours, and thereafter the products must be air cured for a period of 30 to 60 days before the shrinkage of the product is completed and before the necessary structural strength is attained that will allow the product to be utilized as a structural material. In this connection, however, it is to be noted that steam curing has contributed greatly to the use of concrete products and that once the hydration is complete or very nearly complete, the concrete blocks or other products may be removed from the molds and handled quite easily thereby reducing the amount of equipment that is necessary to achieve particular production rates. However, due to the long air curing cycle, it is necessary that the manufacturer have a large amount of unsalable inventory which is in the state of curing.

It has also been proposed that concrete products be cured in a carbon dioxide atmosphere to increase the speed at which the curing process occurs. However, in general, the exposure of the concrete products to a carbon dioxide atmosphere is effective only to carbonate the outer shell of the products. Although "bleeding" and other undesirable side effects of the curing operation are eliminated, in general the exposure to carbon dioxide is not effective to accomplish the desired rapid curing of the concrete products. The products resulting from such a curing process cannot be immediately used as structural materials as initially the strength of the materials will be low and shrinkage of the products will continue to occur.

The autoclave process for curing concrete products is also used to a great extent. In the autoclave process for curing concrete products, products are placed in a pressure vessel and subjected to steam at greatly increased pressures. Although this process greatly increases the curing speed, the cost of an autoclave installation is very high. In addition, the products which result from the autoclave process often time possess undesirable characteristics in that the autoclave process changes the structure of the product from a colloidal to a macrocrystalline structure which is extremely hard and brittle. In general, the products which result from the autoclave process are less flexible and have a lower modulus of elasticity than concrete products which are cured using normal means. In addition, in some instances although an apparently good product results from the autoclave process, aging of the product often results in deterioration rather than increase in strength and elasticity of the product as normally results from the aging of concrete products.

The present invention provides an improved method and apparatus for curing concrete products. By utilizing the principles of the present invention, concrete products may be completely cured in as little as 16 hours. The product which results from the process of the present invention possesses physical characteristics which compare favorably and often time exceed the characteristics of products which have been subjected to a normal steam cure and then allowed to air cure for periods of more than one year. Long periods of testing have revealed that there is no subsequent deterioration of the product and, in fact, that the structural characteristics of the products continue to improve in the nature of products that are cured by the normal air cure process.

The process provided by the present invention is essentially a three phase process. The first phase of the process is one which is conventional in the art and comprises subjecting the concrete products to an initial steam cure to hydrate the cement. Generally speaking, in the first phase of the curing process, the products are placed in a kiln and subjected to steam at a temperature in the order of 160° F. for approximately 8 hours. The temperature of the steam and the time of the first phase of the curing cycle can vary over reasonably wide ranges depending upon the volume and density of the products to be cured. In general, it will suffice to say that the first phase of the process must be sufficiently long that the hydration of the cement comprising the concrete products reaches what is known in the art as the stable jell state. Hydration of the cement will be approximately 80% to 95% complete in the stable jell state, dependent upon the composition of the block. If hydration is stopped before the chemical reaction between the cement and the water has progressed to the stable jell state, the resultant product will in some instances be adversely affected.

At the end of phase 1, a carbon dioxide generator is energized and the concrete products are simultaneously subjected to steam and carbon dioxide at ambient pressures. The temperature, relative humidity and time involved in phase 2 are somewhat critical, and thus are controlled in a predetermined manner. As the result of phase 2 of the process, a completely carbonated region of appreciable depth is formed in the surface of the products to be cured.

Phase 3 of the process comprises decreasing the humidity within the kiln to near zero and increasing the temperature to whatever is necessary to obtain complete carbonation of the deeper areas of the products and to remove all remaining moisture. Temperatures of up to 500° F. have been used.

Old concrete products which have not previously been carbonated will receive beneficial results from the process provided by the present invention. It is to be noted, however, that new concrete mixes preferably contain a suitable retarding agent that will extend the initial set period. Otherwise, the high curing temperatures may cause strength retrogression.

Figure 2:
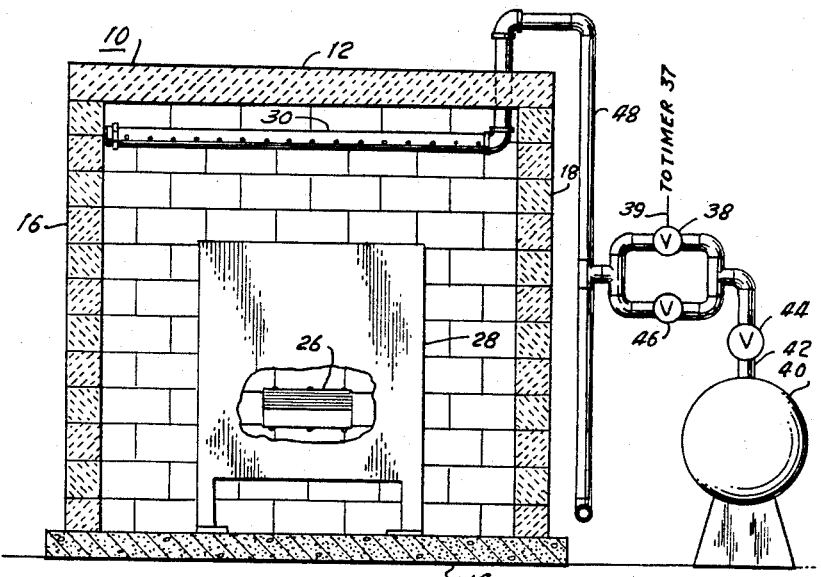

Many objects and advantages of the present invention will become readily apparent to those skilled in the art as the following detailed description of the same unfolds when taken in conjunction with the appended drawings wherein like reference numerals denote like parts and in which:

FIGURE 1 is a side elevation view in cross section illustrating the apparatus provided by the present invention; and FIGURE 2 is a cross section view taken along line 2—2 of FIGURE 1 further illustrating the details of the apparatus provided by the present invention.

Turning now to the drawings, the kiln utilized in practicing the present invention is designated generally by the reference numeral 10. It includes a floor 14, a roof 12, two side walls 16 and 18 and an end wall 20 which are preferably formed of heat resistant materials. It is practical for one end of the kiln to be a sliding metal door 22 to facilitate access to the interior of the kiln for purposes of positioning and removing the products to be cured. Movable racks 24 upon which the blocks 25 or other products to be cured are placed may also be provided.

A carbon dioxide generator 26 is mounted in the end wall 20. In its preferred form, the carbon dioxide generator 26 comprises a burning having a desired number of venturis which are fed by a fan. The carbon dioxide generator 26 preferably burns natural gas, although other carbon fuels such as fuel oil may be utilized. The carbon dioxide generator 26 is of conventional type and commercially available units may be used.

A flame is produced at the output of the carbon dioxide generator 26 along with a large volume of very hot gases. A heat shield 28 is positioned in front of the carbon dioxide generator 26 to prevent the flame and hot gases produced by the generator impinging directly onto the products which are being cured. The heat shield 28 is preferably of limited area such that free flow of steam and gas may be obtained about the periphery of the heat shield. As shown, the heat shield 28 is spaced apart from the carbon dioxide generator 26 to provide a space for the flow of steam and gas between the shield 28 and the end wall 20 and to allow free discharge of the carbon dioxide from the generator 26.

One or more steam inlet pipes 30 may be suspended from the roof to the kiln as shown. The steam inlet pipe 30 is suitably perforated along one side to direct steam in the direction of the door. One or more steam inlet pipes 32 are also mounted on the floor of the kiln. The pipe 32 is perforated along the side such that steam flowing from the pipe 32 will be ejected in a direction toward the carbon dioxide generator. Thus, it is apparent that the location of the steam pipes and the manner in which they are perforated will cause a continuous circulation of steam and other gases within the kiln. The size of the perforations formed in the pipes 30 and 32 is chosen in relation to the steam pressure to provide sufficient velocity of steam to obtain the desired circulation and also to obtain a certain amount of cooling due to expansion of the steam as it leaves the pipes 30 and 32.

A senser 34 is also provided. The senser 34 suitably comprises a thermocouple which functions as a thermally actuated switch and may be of any type that is acceptable for use up to temperatures in excess of those encountered in the process. The senser 34 is connected through lead 36 to a timer 37 and thence by lead 39 to a solenoid operated valve 38. The connections to the solenoid operated valve 38 are such that when the timer 37 is closed, the valve 38 will open when the senser contacts on the senser 34 close responsive to the temperature within the kiln exceeding a predetermined set value.

As shown in FIGURE 1, the timer 37 may be mounted on the rear wall 20 of the kiln 10. In addition to controlling the time at which the senser 34 is effective, the timer 37 also controls the operation of the carbon dioxide generator 26. Thus, the timer 37 is set for a time equal to the time cycle of phase 1 such that at the end of phase 1 a metered amount of gas or other fuel will be applied to the carbon dioxide generator 26. The carbon dioxide generator 26 is normally provided with a pilot light such that the carbon dioxide generator 26 will become effective at the instant the fuel is applied responsive to the clothing of the timer 37.

As illustrated in FIGURE 2, the steam utilized in the curing process is supplied by a boiler 40 which may be of conventional type. The steam produced by the boiler 40 is applied through pipe 42 and valve 44 to a valve 46 and to the solenoid operated valve 38. The valve 44 is suitably a gaet type valve and the valve 46 is suitably a plug type valve. The outputs of each of the valves 38 and 46 are connected to a pipe 48 which connects to the steam inlet pipes 30 and 32 as shown.

In practicing the invention, the blocks 25 or other products to be cured are positioned in the kiln 10 on suitable racks 24. The valve 44 is opened allowing a metered amount of steam to flow through the plug valve 46 in the pipe 48 to the steam inlet pipes 30 and 32. If desired, the valve 44 may also be solenoid operated such that it will automatically open responsive to closing of the timer 37 at the beginning of phase 1 of the process. The metered amount of steam is attained by adjusting the plug valve 46. Once this adjustment is made, it ordinarily will not be necessary to change it for subsequent curing cycles.

The metered amount of steam which the plug valve 46 allows to be admitted to the kiln is sufficient to cause the humidity within the kiln to increase almost immediately to virtually 100% and the temperature within the kiln to increase slowly to a predetermined desired level. It is preferred that the temperature within the kiln increase to the predetermined level at a rate of 10° F. to 20° F. per hour. If the rate of rise in temperature should substantially exceed 40° F. per hour, the quality of the products obtained from the process will be adversely affected. Due to the manner in which the inlet pipes 30 and 32 are located and vented, a continuous circulation of steam is provided maintaining uniform temperatures and humidities throughout the kiln thereby insuring that all products will be subjected to substantially uniform curing conditions thereby obtaining uniformity of product characteristics.

It is desirable that the pressure at which the steam is injected into the kiln be maintained as uniform as possible to insure that a constant steam temperature will be maintained, thus making it possible to achieve and maintain the desired maximum temperatures and desired rate of increase in temperature. In this connection, it should be noted that the senser 34 is adjusted such that its contacts will close only at temperatures in excess of those desired in phase 1 of the process. Therefore, during phase 1 of the process, the contacts of senser 34 will remain open and the solenoid operated valve 38 will remain closed and no steam will be admitted to the pipe 48 through the valve 38.

The concrete products to be cured are usually in a relatively dry state when they are first placed in the kiln. That is to say, only sufficient water is added to the mix at the time the products are formed to bind the ingredients together. If sufficient moisture is initially added to the mix to obtain complete hydration of the product, the shape of the article could not be maintained without utilizing molds. During the phase 1 of the process, the steam within the kiln will initially be at a considerably higher temperature than the products being cured, causing condensation of water onto the products from the saturated steam atmosphere of the kiln.

Thus, during phase 1 of the process, the manner in which the steam is injected into the kiln insures that the temperature and humidity will be substantially uniform at all points throughout the kiln. The steam also provides a humidity of 100% within the kiln thereby providing moisture to obtain hydration of the cement. In addition, the steam increases the temperature within the kiln and thereby increases the rate at which hydration of the products occurs.

The particular temperature which is utilized in phase 1 of the process is dependent upon the density of the products being cured. High density products are preferably cured at lower temperatures in the order of 140° F. and the lighter low density products are suitably cured at temperatures in the order of 180° F. At temperatures substantially less than 140° F., the time required for hydration of the product will be increased to some extent without any attendant advantage. At temperatures in excess of 180° F., there does not appear to be appreciable increase in the acceleration of the hydrating action and temperatures greatly in excess of 180° F. may produce detrimental results.

In general, it has been found that (for concrete blocks of 8″ x 8″ x 16″ or similar size), if duration of phase 1 is less than four hours, the concrete will not be properly hydrated and that if the phase 1 of the process is extended for times greater than 12 hours, no additional beneficial results will be obtained. With the temperature of the kiln maintained at approximately 160° F., it has been found that a curing time for phase 1 of 8 hours is considered normal for concretes with a density of 120# or more per cubic foot, and that 6 hours of curing during phase 1 will be adequate for concretes of density less than 120# per cubic foot. The time must, of course, be increased for products having a large volume.

At the end of phase 1 of the process, the timer 37 will cause a metered amount of gas or other fuel to be applied to a desired number of the venturis of the carbon dioxide generator 26. In this connection, it is to be noted that the carbon dioxide generator 26 is normally provided with pilot lights such that the generator 26 will become effective at the instant fuel is applied. The steam which is present in the kiln at the end of phase 1 of the process provides a safety feature in that even though the generator did not light and a considerable amount of gas was injected into the kiln, the presence of the steam would considerably lessen the possibility of explosion occurring.

The carbon dioxide generator 26 will produce both heat and carbon dioxide as the fuel which is applied to it is burned. The heat produced by the carbon dioxide generator 26 will cause the temperature within the kiln to increase slowly to some temperature at which the heating effect produced by the thermal energy generated by the generator 26 is balanced by the amount of thermal energy absorbed by the steam and radiated from the kiln. As the temperature within the kiln increases to a temperature in excess of the boiling point of water, the relative humidity within the kiln will decrease. The realtive humidity within the kiln can thus be controlled by controlling the temperature of the kiln.

For satisfactory results, it is desirable that the ultimate temperatures that would be reached with the metered amount of steam being continuously applied to the kiln be equal to the temperature that will produce the desired relative humidity within the kiln. As such a balance is extremely difficult to achieve, provision is made for allowing the ultimate temperature that would be reached with the metered amount of steam applied to the kiln being considerably in excess of the desired maximum temperature. The senser 34 is adjusted that its contacts will close at temperatures above the desired temperature and open at temperatures below the desired temperature. Thus, at all temperatures below the temperature which will produce the desired relative humidity, the solenoid operated valve 38 will be closed. However, if the temperature within the kiln increases above the desired temperature, the contacts of the sensor 34 will close, causing the solenoid operated valve 38 to open. As the valve 38 opens, the maximum amount of steam that is possible to discharge into the kiln from the boiler 40 will be admitted to the kiln. The additional steam which is injected into the kiln responsive to the opening of the valve 38 is effective to lower the temperature of the kiln to a temperature less than that required to produce the desired relative humidity. As the temperature falls below the desired level, the valve 38 will close preventing extra steam from being injected into the kiln and thereby preventing further cooling. Thus, the extra steam injected into the kiln responsive to the closure of the contacts of the senser 34 is effective to maintain the desired temperature and humidity within the kiln.

The capacity of the carbon dioxide generator is limited by the amount of heat produced by the generator in that the maximum amount of heat generated must not be sufficient to raise the temperature of the kiln above the desired temperature level in the presence of the maximum amount of steam. Although the maximum amount of carbon dioxide which can be produced is limited by the heating effect of the generator, it must be noted that by utilizing steam in the manner described above to control and reduce the temperature of the kiln, much greater quantities of fuel can be consumed and, hence, much greater quantities of carbon dioxide can be produced than would be possible or feasible without the benefit of the cooling produced by the steam.

Thus, in phase 2 of the process, a carbon dioxide generator which burns a natural gas or similar carbon fuel is utilized to produce heat and carbon dioxide. The temperature is allowed to increase, causing the relative humidity within the kiln to slowly decrease to a relative humidity that is preferably in the order of 40% to 60%. Thereafter, the desired relative humidity is maintained by periodically injecting an amount of steam in excess of the metered amount into the kiln responsive to the temperature of the kiln exceeding a predetermined temperature which produces the desired relative humidity. Although the amount of carbon dioxide which can be produced by the carbon dioxide generator is limited by the heat produced in the reaction, the cooling effect of the steam makes it possible to operate the carbon dioxide generator at a rate which will produce a satisfactorily high concentration of carbon dioxide.

As was true of phase 1, the duration of phase 2 is dependent to a large extent of the density and volume of the products being cured. For average cementitious products such as building blocks, however, the time for phase 2 will be approximately 8 hours. It is also important that the humidity of the kiln be reduced rather slowly from the 100% humidity which existed at the end of phase 1 to the desired humidity which is to be established in phase 2 of the process. In general, it is preferred that the humidity be slowly decreased at a rate not to exceed 20% per hour. As the supplemental steam will not be injected into the kiln until such time as the temperature of the kiln exceeds the temperature which will produce the desired humidity, the capacity of the carbon dioxide generator must be chosen with due regard to the metered amount of steam being introduced into the kiln and the volume of the kiln to insure that the desired slow change in relative humidity and slow increase in temperature will occur.

During phase 2 of the process, the injection of steam into the kiln provides the desired circulatory action described previously with reference to phase 1, thereby insuring that as the concentration of carbon dioxide, the humidity within the kiln and the temperature within the kiln will be substantially uniform at all points thereby insuring that all of the products within the kiln will be cured uniformly. In addition, the relative humidity within the kiln is important as it controls the rate at which carbonization occurs. If the relative humidity exceeds 70%, carbonization will be extremely slow as the moisture will retard the reaction between the concrete product and the carbon dioxide. At a relative humidity of less than 35%, a case hardening effect is produced which prevents successful curing. It is desirable to have a slow decrease in humidity to produce controlled carbonation from the surface in as the humidity of the kiln decreases.

At the end of phase 2, the timer 37 is effective to remove the senser 34 from the circuit, causing the solenoid operated valve 38 to close and remain closed for the balance of the curing cycle. Dependent upon the capacity of the carbon dioxide generator being used in conjunction with the metered amount of steam which is continuously injected into the kiln through the valve 46 and the ultimate temperature which is desired to be obtained during phase 3 of the process, at the end of phase 2 the timer 37 may also cause fuel to be applied to additional venturis of the carbon dioxide generator 26.

The temperatures at which the kiln finally stabilize during phase 3 will be dependent upon the amount of heat produced in the kiln by the carbon dioxide generator 26 as balanced against the cooling produced by the metered amount of steam which is continuously injected into the kiln and the amount of heat which is otherwise dissipated within the kiln. The maximum amount of heat which may be generated by the carbon dioxide generator 26, and consequently the maximum amount of carbon dioxide which may be produced are, therefore, controlled by the maximum ultimate temperatures which are desired. In general, it has been found that if the process is being utilized for curing colored products, the maximum ultimate temperatures during phase 3 of the process should not greatly exceed 275° F. or the color of the products will be adversely affected. On the other hand, ultimate temperatures of in excess of 500° F. have been successfully used in curing light weight concrete block products. The metered amount of steam is continuously injected during phase 3, making it practical to generate large quantities of carbon dioxide gas without exceeding the desired ultimate temperatures. In addition, as is true in each phase of the process, the steam which is injected into the kiln provides continuous circulation within the kiln thereby insuring that the curing conditions will be substantially uniform throughout the kiln.

The timer 37 is set to open at the end of phase 3 shutting off the supply of fuel to the carbon dioxide generator 26. If desired, the valve 44 may be operated by an electrical solenoid in which instance the timer 37 could also be utilized for purposes of closing the valve 44 and ending the injection of steam in to the kiln. The duration of phase 3 again depends to a considerable extent on the density and volume of the products being cured. The duration of phase 3 would be such that the blocks will be completely dried and carbonation of the deeper areas of the products will be obtained. In general, times of 8 hours for phase 3 have provided acceptable results for a wide range of products. However, this time will be greatly dependent upon the ultimate temperatures which are obtained during phase 3 and the volume and density of the products to be cured.

Thus, in practicing the process provided by the present invention, the concrete products to be cured are formed of suitable mixes and thereafter subjected to a conventional steam curing process to produce substantially complete hydration of the product. In phase 2 of the process, the temperatures which exist at the end of phase 1, the steam curing phase, are increased to a temperature that will lower the relative humidity of the kiln to approximately 35% to 70%. At the higher humidities which exist in the early part of phase 2 of the process, the water within the pores of the product prevent carbon dioxide being applied to any but the surface of the product. Thereafter, the rate at which carbonation of the product occurs is controlled by controlling the relative humidity. Case hardening of the product as would seal moisture within the unit and prevent complete curing is prevented by maintaining the relative humidity of the kiln in excess of 35%. Virtually any relative humidity in excess of 35% can be used. However, if the humidity within the kiln is in excess of 70%, the rate at which the carbonization proceeds is extremely slow. The preferred humidity range for phase 2 of the process is in the order of 45% to 50%. At the end of phase 2 of the process, the surface regions of the product will be carbonated to an appreciable depth without the pores of the product becoming sealed to the extent that the moisture within the product which remains within the product cannot escape and carbon dioxide cannot be applied to the deeper portions of the product.

In phase 3 of the process, the temperature of the kiln is allowed to increase to the desired ultimate temperature, which may be in excess of 500° F. The relative humidity within the kiln falls to zero or substantially zero due to the high temperatures which are present. As the result of the high temperatures and low humidities which are obtained during phase 3 of the process, the product will be completely dried and carbonation of the deeper areas of the product will occur. Even during phase 3 of the process, the relative humidity will decrease from the humidity which prevailed at the end of phase 2 of the process to zero percent at a rather slow rate insuring that the carbonization will proceed in a slow, controlled manner from the surface of the product toward the inner-most depth of the product.

The product is in salable condition at the end of phase 3 of the process. The product which results from the process is pre-aged and pre-shrunk to the extent that it possesses substantially the same characteristics as concrete which has been allowed to cure in air for a period of one to two years. The product produced by the present process is not subject to bleeding as the water soluble products which are normally present in concrete products are stabilized by the chemical reaction with the carbon dioxide.

According to one specific example of the invention, a concrete mix was formed having the following composition:

36 cubic feet of expanded shale aggregate
4 cubic feet of Portland cement
2 cubic feet of fine limestone
4 ounces of retarding agent Only enough water was added to the mixture to bind the ingredients together. The mixture was molded to form concrete blocks having dimensions of 8" x 8" x 16". The molded blocks were placed on racks in the kiln and the door was closed. It is to be noted that although the door was closed, it is not necessary that an air tight seal be produced in that the entire curing cycle occurs at substantially ambient atmospheric pressures. The valve 46 was adjusted to produce a temperature of approximately 180° F. within the kiln during phase 1 of the process. Valve 44 was then opened allowing steam to be injected into the kiln. The relative humidity within the kiln had increased to 100% after only a few minutes, and at the end of 3 hours, the temperature within the kiln was approximately 180° F. At the end of 6 hours, the hydration of the cement was approximately 90% complete and the blocks had reached the stable jell state. The carbon dioxide generator was then actuated. The burning of fuel by the carbon dioxide generator produced sufficient carbon dioxide to provide a concentration of approximately 10% to 20% by volume carbon dioxide within the kiln. After three hours, the relative humidity within the kiln was 40% and the temperature of the kiln was 215° F. The relative humidity of 40% was maintained until the end of phase 2 by the opening and closing of the senser element responsive to changes in temperature of the kiln. At the end of 8 hours, complete carbonation of the blocks occurred to a depth of approximately ¾" from the surface. The circuit by which the senser controlled the solenoid operated valve was then disabled and the temperature within the kiln increased to 300° F. The humidity within the kiln dropped to very near 0% after the temperature had increased only a few degrees. At the end of 8 hours, the carbonation of the product had extended into the deeper areas and the product was virtually completely dry. The product was then in a volume stable condition.

According to a second specific example of the invention, the concrete mix was formed having the following composition:

30 cubic feet of crushed limestone rock
6 cubic feet of sand
4 cubic feet of cement
4 ounces of retarder
20# of red cement color
6 ounces of wetting agent The density of the concrete produced by this mix was approximately 127# per cubic foot. Only enough water was added to the mixture to bind the ingredients together. The mixture was molded to form concrete bricks having dimensions of 3⅝" x 2¼" x 7⅝". The molded bricks were placed on racks in the kiln and the doors were closed. The valve was open causing a metered amount of steam to be admitted into the kiln. The relative humidity within the kiln increased to 100% very quickly and after 3 hours, the temperature within the kiln was approximately 140° F. At the end of 8 hours, the hydration of the cement was approximately 80% complete and the bricks had reached the stable jell state. The carbon dioxide generator was then energized by applying natural gas fuel to its burners. The amount of natural gas consumed by the carbon dioxide generator was sufficient to produce a concentration of 10% to 20% carbon dioxide by volume within the kiln. The heat produced by the carbon dioxide generator caused the temperature within the kiln to increase to 215° F. and the relative humidity within the kiln to decrease to 40%. Thereafter, the relative humidity of 40% was maintained by periodically injecting additional steam into the kiln responsive to closure of the thermally actuated senser. At the end of 8 hours, complete carbonization of the bricks occurred to a depth of approximately ½" from the surface. The temperature of the kiln was then allowed to increase to 260° F., causing the humidity to fall to near 0%. At the end of 8 hours, carbonization of the product had extended into the deeper areas and the product was virtually completely dry. The product was then in volume stable condition.

According to a third specific example of the invention, the concrete mix was formed having the following composition:

36 cubic feet of pumice
2 cubic feet of Portland cement
2 cubic feet of silica flour
2 cubic feet of hydrated lime
4 ounces of wetting agent
4 ounces of retarder Only enough water was added to the mixture to bind the ingredients together. The mixture was molded to form concrete blocks having dimensions of 8" x 8" x 16". The molded blocks were placed on racks in the kiln and the doors closed. A metered amount of steam was injected into the kiln, causing the relative humidity of the kiln to increase to 100% after a few minutes and causing the temperature of the kiln to increase to 180° F. At the end of 6 hours, hydration of the product was approximately 90% complete and the blocks had reached the stable jell state. Fuel was then applied to the carbon dioxide generator, causing heat and carbon dioxide to be produced. The temperature within the kiln slowly increased to 212° F. at which temperature the relative humidity within the kiln was maintained at approximately 60%. At the end of 10 hours, carbonization of the blocks occurred to a depth of approximately ¾" from the surface. Extra venturis were then turned on and the senser circuit was disabled. At the end of 4 hours, the temperature within the kiln was 500° F. and the blocks were fully cured.

According to a fourth specific example of the invention, the concrete mix was formed having the following composition:

36 cubic feet of coal cinders
2 cubic feet of Portland cement
2 cubic feet of silica flour
2 cubic feet of limestone flour
4 ounces of retarder
4 ounces of wetting agent Only enough water was added to the mixture to bind the ingredients together. The mixture was molded to form concrete blocks having dimensions of 8" x 8" x 16". The molded blocks were placed on racks in the kiln and the doors closed. A metered amount of steam was injected into the kiln, causing the relative humidity of the kiln to increase to 100% after a very few minutes and causing a temperature of approximately 160° F. to be produced after 3 hours. After 8 hours, the product was in the stable jell state and the carbon dioxide generator was energized by providing fuel for the burners. The temperature of the kiln was allowed to increase to 209° F., producing a relative humidity within the kiln of 75%. After 12 hours, the product was carbonated to a depth of approximately ¾" from the surface and the temperature within the kiln was allowed to increase to 350° F. At the end of 6 hours, the product was fully cured.

According to a fifth specific example of the invention, the concrete mix was formed having the following composition:

36 cubic feet of scoria
4 cubic feet of Portland cement
2 cubic feet of fine limestone
4 ounces of retarder Only enough water was added to the mixture to bind the ingredients together. The mixture was molded to form concrete blocks having dimensions of 8" x 8" x 16". The molded blocks were placed on racks in the kiln and the doors closed. A metered amount of steam was injected into the kiln, causing the temperature to increase to 160° F. and the relative humidity to increase to 100%. After 8 hours, the stable jell state was obtained. The temperature of the kiln was then allowed to increase to 220° F., producing a relative humidity within the kiln of 30%. After six hours, certain of the blocks were examined and found to be covered with a dry hard outer shell. After 8 hours of curing at 350° F., the deeper portion of the product remained in a moist, uncured state.

Cement bricks produced in accordance with specific Example #2 were tested and found to have compressive strength in the order of 3500 p.s.i. The water absorption of the bricks averaged 11.7# per cubic foot and the moisture content averaged 5%. The linear shrinkage of the bricks was 0.27%. The above complies with the physical requirements of the Corps of Engineers Specification CRD–73, Group 2. The concrete blocks produced in accordance with the specific Examples 1, 3 and 4, typically had a compressive strength in excess of 1300 p.s.i., the percent absorption by 24 hour submersion in cold water was less than 14% and the moisture content averaged less than 1%. The linear shrinkage of the blocks averaged 0.016. All units exceeded the physical requirements of Specification ASTM (C90–52), Grade "A" and Federal Specification SS–C–621.

The temperatures utilized in the above specific examples were obtained in utilizing thermo-couples and are, therefore, subject to the error of the metering equipment. The relative humidity during various phases of the curing process were measured utilizing wet and dry bulb temperature readings and checked by measuring the moisture content of products being cured.

The apparatus described for use in practicing the present invention utilizes relatively inexpensive and simple control equipment. Obviously, if desired, the controls could be obtained manually by an operator observing the continuous indication of the temperature or relative humidity within the kilns. Alternatively, completely automated equipment which utilized set temperature humidity time curves could be utilized to provide a completely automated system in which the various temperatures and humidities and change in temperatures and humidities would be precisely controlled. However, the apparatus described herein has provided excellent results at a minimum of capital expense and maintenance cost.

The retarding agents which are included as a portion of the various mixes are conventional retarding agents which are widely used for retarding the rate at which concrete products set. The retarding agents are usually ligno sulphonates which are by-products of the paper industry. An acceptable retarding agent is sold under the trademark "Edicon" by Edict Laboratories, Milwaukee, Wisconsin.

The use of a wetting agent to obtain better mixing is also conventional in the art. A suitable wetting agent is the NR plastic sold by Edict Laboratories of Milwaukee, Wisconsin or the Solar Granules #40 sold by Swift and Company.

Although the invention has been described with regard to particular preferred examples and embodiments of the same, many changes and modifications will become obvious to those skilled in the art in view of the foregoing description. The invention is, therefore, intended to be limited only as necessitated by the scope of the appended claims and not to what has been shown herein.

What we claim is:

1. The method of curing concrete products in a kiln that comprises:
    (A) subjecting a product to be cured to at least partially saturated steam to produce substantial hydration of the product;
    (B) subjecting the hydrated product to an atmosphere comprising a substantial amount of carbon dioxide and having a relative humidity in excess of 35% and a temperature in excess of that prevailing during step A to produce carbonation of the surface areas of the product; and
    (C) thereafter subjecting said product to an atmosphere comprising a substantial amount of carbon dioxide and having a relative humidity of less than 35% and a temperature at least as high as that prevailing during step B to dry said product and produce carbonation of the deeper areas of said product.

2. The method of curing concrete products that comprises:
    (A) subjecting a product to be cured to at least partially saturated steam to produce substantial hydration of the product;
    (B) subjecting the hydrated product to an atmosphere comprising at least 10% by volume carbon dioxide and having a relative humidity of greater than 35% and a temperature at least as high as the vaporization temperature of water to produce carbonation of the surface regions of said product; and
    (C) thereafter subjecting said product to an atmosphere comprising at least 10% by volume carbon dioxide and having a relative humidity of less than 35% and a temperature at least as high as the vaporization temperature of water to dry the product and produce carbonation of the deeper regions of the product.

3. The method as defined in claim 1 wherein the temperature of said atmosphere having a relative humidity of greater than 35% is in excess of the vaporization temperature of water.

4. The method as defined in claim 3 wherein the temperature of said atmosphere having a relative humidity of less than 35% is higher than the temperature of said atmosphere having a relative humidity of greater than 35%.

5. The method of curing concrete products that comprises:
    (A) placing the product to be cured in a kiln;
    (B) admitting a metered amount of steam into said kiln to produce an atmosphere within said kiln having a relative humidity of near 100% and a temperature in the range of 130° F. to 190° F.;
    (C) maintaining said conditions of near 100% humidity and a temperature in the order of 130° F. to 190° F. for a time sufficient to produce substantially complete hydration of the product;
    (D) introducing sufficient carbon dioxide into said kiln to maintain a concentration of at least 10% carbon dioxide within said kiln;
    (E) increasing the temperature within the kiln to a temperature in excess of the vaporization temperature of water and simultaneously admitting sufficient steam into said kiln to maintain the humidity of the atmosphere within said kiln in excess of 35% relative humidity;
    (F) maintaining said temperature within said kiln in excess of the vaporization temperature of water and the humidity within said kiln in excess of 35% for a time sufficient to produce carbonation of the surface areas of said product;
    (G) increasing the temperature within said kiln to decrease the humidity within said kiln to a relative humidity of less than 35%; and
    (H) maintaining said increased temperature and humidity of less than 35% for a time to produce drying of the product and substantial carbonation of the deeper areas of said product.

6. A 3 phase process for curing concrete products in a kiln:
    (A) the first phase comprising the step of subjecting the product to be cured to a steam cure to produce substantial hydration of said product;
    (B) the second phase comprising the step of subjecting said product to a substantial concentration of carbon dioxide at a temperature in excess of the vaporization temperature of water and a relative humidity in excess of 35% to produce carbonation of the surface areas of said product; and
    (C) the third phase comprising the step of subjecting said product to a substantial concentration of carbon dioxide at temperatures in excess of the temperature prevailing during phase 2 of the process and relative humidity of less than 35% to produce drying and carbonation of the deeper areas of said product.

7. A process as defined in claim 6 wherein a metered amount of steam is injected into the kiln throughout the process.

8. A process as defined in claim 7 wherein the concentration of carbon dioxide to which the products are subjected during phases 2 and 3 of the process is in excess of 10% by volume.

9. A process as defined in claim 8 wherein the temperature to which the product is subjected in phase 3 of the process is greater than the vaporization temperature of water and less than 550° F.

10. A process as defined in claim 9 wherein the relative humidity during phase 2 of the process is slowly decreased from the 100% relative humidity prevailing at the end of phase 1 to the relative humidity of greater than 35% but less than 75%.

11. A process as defined in claim 10 wherein the humidity of the kiln during phase 2 of the process is controlled by periodically injecting an amount of steam in excess of the metered amount into said kiln.

12. The method of curing concrete articles that comprises subjecting the article to light steam in an ambient pressure until hydration of the article is substantially complete, introducing carbon dioxide gas into the kiln to provide a residual concentration of at least 10% by volume, simultaneously applying heat to raise the internal temperature of said kiln above the boiling point of water and varying at least one of the amount of steam and the amount of heat applied to said kiln to slowly decrease the relative humidity of the kiln to between 40% and 70% to produce carbonation of the surface regions of said article and thereafter decreasing said humidity to near 0% humidity and increasing said temperature to less than 550° F. to complete carbonation of the deeper regions of said article.

13. The method of completing the cure of substantially hydrated concrete products that comprises:
  (A) placing the products to be cured in a kiln;
  (B) providing an atmosphere of saturated steam in said kiln;
  (C) heating said atmosphere to reduce the relative humidity of said atmosphere to the greater than 35% relative humidity;
  (D) simultaneously injecting carbon dioxide into said kiln to produce a concentration of at least 10% by volume carbon dioxide;
  (E) maintaining said relative humidity of greater than 35% and said concentration of at least 10% carbon dioxide while continuously injecting steam into said kiln for a time to produce carbonation of the outer regions of said product; and
  (F) increasing the temperature of said kiln to reduce the relative humidity within said kiln to near 0% while continuing to inject steam and carbon dioxide into said kiln to dry the product and produce carbonation of the deeper regions of said product.

References Cited by the Examiner

UNITED STATES PATENTS

| | | | |
|---|---|---|---|
| 1,561,473 | 11/1925 | Lukens | 106—85 |
| 1,597,811 | 8/1926 | Lukens | 106—85 |
| 1,986,335 | 1/1935 | Halback | 106—89 |

OTHER REFERENCES

Lea and Desch: "The Chemistry of Cement and Concrete," Arnold (Pub.) Ltd., 1956, pages 225 and 475 and 476.

ALEXANDER H. BRODMERKEL, *Primary Examiner.*

JOSEPH REBOLD, *Examiner.*

J. B. EVANS, J. H. WOO, *Assistant Examiners.*